US010812585B2

(12) United States Patent
Kumar et al.

(10) Patent No.: US 10,812,585 B2
(45) Date of Patent: Oct. 20, 2020

(54) ADAPTIVE CONNECTION POLICY FOR DYNAMIC LOAD BALANCING OF CLIENT CONNECTIONS

(71) Applicant: EMC IP Holding Company LLC, Hopkinton, MA (US)

(72) Inventors: Shiv Shankar Kumar, Pune (IN); Jai Prakash Gahlot, Pune (IN); Amit Kumar Chauhan, Pune (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 101 days.

(21) Appl. No.: 16/050,550

(22) Filed: Jul. 31, 2018

(65) Prior Publication Data
US 2020/0045106 A1   Feb. 6, 2020

(51) Int. Cl.
| | | |
|---|---|---|
| *H04L 29/08* | (2006.01) | |
| *H04L 12/24* | (2006.01) | |
| *G06F 11/30* | (2006.01) | |
| *G06F 11/34* | (2006.01) | |

(52) U.S. Cl.
CPC ...... *H04L 67/1095* (2013.01); *G06F 11/3006* (2013.01); *G06F 11/3409* (2013.01); *H04L 41/06* (2013.01); *H04L 41/0893* (2013.01); *H04L 67/1002* (2013.01); *H04L 67/1097* (2013.01)

(58) Field of Classification Search
CPC . G06F 16/1824; H04L 41/5025; H04L 43/16; H04L 47/74; H04L 67/1034
See application file for complete search history.

(56) References Cited

U.S. PATENT DOCUMENTS

| | | | |
|---|---|---|---|
| 8,412,810 B1* | 4/2013 | Tompkins | G06F 9/45558 709/201 |
| 9,756,121 B2* | 9/2017 | Hwang | H04L 67/101 |
| 9,773,026 B1* | 9/2017 | Tetreault | G06F 11/30 |
| 10,007,455 B1* | 6/2018 | George | G06F 3/0689 |
| 10,481,800 B1* | 11/2019 | Pandian | G06F 11/3433 |

(Continued)

*Primary Examiner* — Oanh Duong
(74) *Attorney, Agent, or Firm* — Amin, Turocy & Watson, LLP

(57) ABSTRACT

An adaptive connection policy for dynamic load balancing of client connections is provided herein. A data storage system as described herein can include a memory that stores computer executable components and a processor that executes computer executable components stored in the memory. The computer executable components can include a watermarking component that defines operating ranges and connection policies for respective performance parameters associated with the data storage system, a performance monitoring component that tracks respective performances of computing nodes of the data storage system with respect to the respective performance parameters, and a policy selection component that selects a connection policy for a performance parameter of the respective performance parameters, resulting in a selected connection policy, in response to a performance of at least one computing node of the data storage system being outside of an operating range of the operating ranges for the performance parameter.

20 Claims, 14 Drawing Sheets

(56) References Cited

U.S. PATENT DOCUMENTS

| | | | |
|---|---|---|---|
| 2012/0196644 A1* | 8/2012 | Scherzer | H04W 48/18 455/524 |
| 2016/0026683 A1* | 1/2016 | Sah | G06F 16/2453 707/770 |
| 2016/0062685 A1* | 3/2016 | Sundararajan | G06F 3/0619 711/162 |
| 2016/0087911 A1* | 3/2016 | Diederich | G06F 16/1824 709/226 |
| 2017/0201601 A1* | 7/2017 | Bright | H04L 63/0807 |
| 2017/0230451 A1* | 8/2017 | Paramasivam | H04L 67/22 |
| 2017/0235805 A1* | 8/2017 | Shetty | G06F 16/178 707/634 |
| 2018/0027468 A1* | 1/2018 | Pasulka | H04L 41/5019 370/235 |
| 2018/0131579 A1* | 5/2018 | Jacobs | H04L 41/046 |
| 2018/0300385 A1* | 10/2018 | Merriman | G06F 16/278 |
| 2018/0309822 A1* | 10/2018 | Baradaran | H04L 67/1008 |
| 2018/0316752 A1* | 11/2018 | Hodges | H04L 67/1023 |

\* cited by examiner

300

| Index | Performance Parameter | High WM | Low WM |
|---|---|---|---|
| 1 | CPU Usage | 70% | 40% |
| 2 | Memory Usage | 60% | 30% |
| 3 | Network Throughput | 80% | 50% |
| 4 | <Custom Parameter 1> | 90% | 60% |
| 5 | <Custom Parameter 2> | 50% | 70% |

500

| Index | Performance Parameter | Node 1 | Node 2 | Node 3 | Node 4 |
|---|---|---|---|---|---|
| 1 | CPU Usage | 70% | 40% | 80% | 50% |
| 2 | Memory Usage | 60% | 30% | 90% | 60% |
| 3 | Ntwk. Throughput | 80% | 50% | 50% | 70% |
| 4 | <Custom 1> | 90% | 60% | 70% | 40% |
| 5 | <Custom 2> | 50% | 70% | 60% | 30% |

FIG. 5

ADAPTIVE CONNECTION POLICY FOR DYNAMIC LOAD BALANCING OF CLIENT CONNECTIONS

TECHNICAL FIELD

The subject application is related to data storage, and more particularly, to techniques for managing client connections to a data storage system.

BACKGROUND

As computing technology has advanced over time, so too has the amount and scope of data that can be maintained and analyzed via computer systems. For instance, the ability to manage very large data sets, commonly known as big data, has led to significant advances in fields such as manufacturing, media, science, and e-commerce, among many others. Data storage systems, such as those utilized in network-attached storage (NAS) platforms, provide the means by which these large sets of data can be maintained in an efficient and reliable way. To facilitate system efficiency and scalability, an NAS platform can utilize a distributed system in which storage and/or computing resources are distributed among multiple computing nodes, which in turn can be arranged into computing clusters. Additionally, an NAS platform can be designed as a single-space storage solution, in which data are stored on the platform via a single volume and a single file system, thereby granting a client connected to any computing node of the platform the ability to access all data stored on the platform.

SUMMARY

The following summary is a general overview of various embodiments disclosed herein and is not intended to be exhaustive or limiting upon the disclosed embodiments. Embodiments are better understood upon consideration of the detailed description below in conjunction with the accompanying drawings and claims.

In an aspect, a data storage system is described herein. The data storage system includes a memory that stores computer executable components and a processor that executes computer executable components stored in the memory. The computer executable components can include a watermarking component that defines operating ranges and connection policies for respective performance parameters associated with the data storage system, a performance monitoring component that tracks respective performances of computing nodes of the data storage system with respect to the respective performance parameters, and a policy selection component that selects a connection policy for a performance parameter of the respective performance parameters, resulting in a selected connection policy, in response to a performance of at least one computing node of the data storage system being outside of an operating range of the operating ranges for the performance parameters.

In another aspect, a method is described herein. The method can include defining, by a device operatively coupled to a processor, operating ranges and connection policies for respective performance parameters associated with a data storage system; tracking, by the device, performances of respective computing nodes of the data storage system with respect to the respective performance parameters; and selecting, by the device, a connection policy for a performance parameter of the respective performance parameters, resulting in a selected connection policy, in response to a performance of at least one computing node of the data storage system being outside of an operating range of the operating ranges for the performance parameter.

In an additional aspect, a machine-readable medium including computer executable instructions is described herein. The instructions, when executed by a processor, can facilitate performance of operations including defining respective operating ranges and respective connection policies for performance parameters associated with a data storage system, tracking respective performances of computing nodes of the data storage system with respect to the performance parameters, and selecting a connection policy of the respective connection policies for a performance parameter of the performance parameters, resulting in a selected connection policy, in response to a performance of at least one computing node of the computing nodes of the data storage system being outside of an operating range of the respective operating ranges for the performance parameter.

DESCRIPTION OF DRAWINGS

Various non-limiting embodiments of the subject disclosure are described with reference to the following figures, wherein like reference numerals refer to like parts throughout unless otherwise specified.

FIG. 5 is a diagram depicting an example data structure that can be utilized to store performance monitoring data in accordance with various aspects described herein.

DETAILED DESCRIPTION

Figure 1:
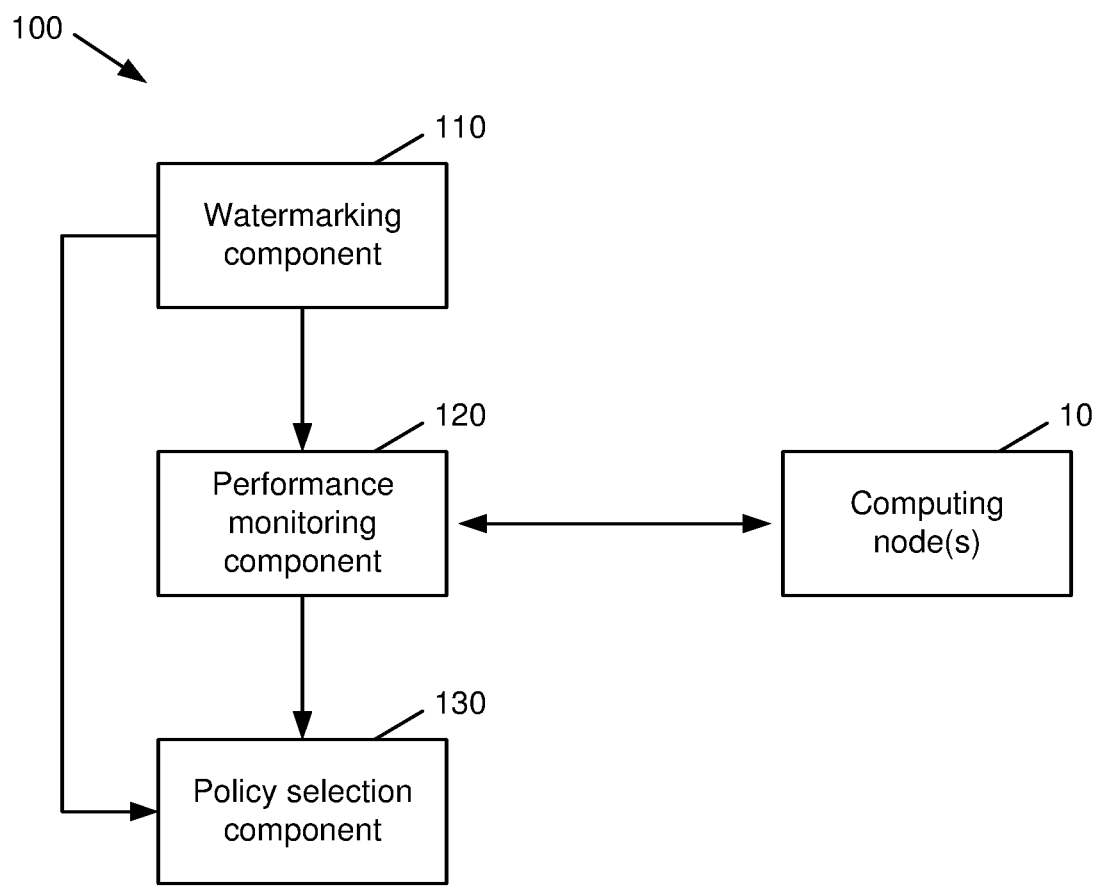
FIG. 1 is a block diagram of a system that facilitates an adaptive connection policy for client connections to an NAS system in accordance with various aspects described herein.

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring certain aspects.

In an aspect, a network-attached storage (NAS) platform can serve as a storage environment for various types of data, which can provide a functionally unlimited amount of storage space for multiple users via a seamless single volume and a single file system. To facilitate management of and access to large-scale data sets, an NAS platform can utilize a distributed computing system that includes multiple computing devices (nodes) that are physically and/or logically connected into clusters. Respective nodes in a NAS cluster can further be configured such that each node enables access (e.g., by a client) to all data stored on the platform.

In an aspect, an NAS system can utilize one or more mechanisms for managing connections to various computing nodes in the system in a manner that is transparent to client users. For instance, an NAS system can utilize a common domain name and/or other means to enable access to the system by a client user via a single user-friendly entry point. The NAS system can then utilize a Domain Name System (DNS) forwarder and/or other means to direct client access requests to respective nodes in the cluster, e.g., by connecting a requesting client to a given NAS node via that node's unique Internet Protocol (IP) address in the cluster.

In the above example, an NAS cluster node can be selected for a given client connection based on respective performance parameters. For instance, when a client connects to the NAS system, the system can direct the client to a given cluster node via its IP address based on a connection policy. Examples of connection policies that can be used can include, but are not limited to, circular round robin, least number of active connections (e.g., IP connections, File Transfer Protocol (FTP) connections, etc.) served, least processor usage, least network throughput (e.g., least network activity), or the like. However, as resource usage and/or other conditions can vary over the course of operation of an NAS system, it is desirable to implement techniques that can dynamically allocate client connections among nodes of an NAS system in an efficient way. In particular, effective utilization of cluster resources can be highly desirable for an NAS system and its users, especially in mission-critical environments such as finance or healthcare and/or environments such as media, entertainment, or oil and gas that regularly utilize large-size files such as high-definition media.

To the foregoing and/or related ends, various embodiments described herein provide techniques by an NAS system can be made aware of changes in system load and dynamically adapt to a different connection policy as per desired parameters. Various embodiments described herein can provide one or more advantages that can improve the functionality of an NAS system. A non-exhaustive list of such benefits is as follows. An NAS system can automatically adapt to a different connection policy without requiring administrator intervention or other manual operations to change the policy. Utilization of NAS cluster resources can be more effective and optimized due to monitoring and taking action on variable performance parameters. Access delays faced by a client can be reduced. Cluster traffic can be normalized by a distribution of client connections over a period of time, thereby providing deterministic usage of computing and/or power resource usage. Other advantages that result in improvements to the operation of an NAS system are also possible.

In general, various embodiments described herein can result in improvements to an NAS system by keeping cluster usage deterministic across various performance parameters. For instance, usage peaks on a particular cluster node can be smoothened by readjusting a connection policy to select one policy over another without manual intervention. As a result, various embodiments described herein can result in a better experience for both the end user and the cluster administrator as well as increased cluster throughput across various parameters.

With reference now to the drawings, FIG. 1 illustrates a system 100 that facilitates an adaptive connection policy for client connections to a data storage system (e.g., an NAS system) in accordance with various aspects described herein. In an aspect, system 100 can be, or can be implemented as part of, an NAS platform and/or other computing platforms on which data sets of varying scope and/or size are desirably stored. As shown in FIG. 1, system 100 can include a watermarking component 110, a performance monitoring component 120, and a policy selection component 130. The watermarking component 110, performance monitoring component 120, and policy selection component 130 can be implemented via one or more NAS devices, such as an NAS controller or computing node and/or any other suitable computing device(s) comprising a memory operatively coupled to a processor.

In the description that follows, the terms "connection" and "client connection" are used to refer to a connection by a client (e.g., a client device or a user of a client device) to a computing node 10 of a distributed data storage system, e.g., for access to files and/or other data stored on the computing node 10 or the data storage system as a whole.

In an aspect, the watermarking component 110 can define operating ranges and connection policies for respective performance metrics or parameters associated with system 100. The performance monitoring component 120 can track respective performances of computing nodes 10 in system 100 with respect to the performance parameters defined by the watermarking component 110. In response to a performance of at least one computing node 10 of system 100 being outside of the operating range for a performance parameter as set by the watermarking component 110, the policy selection component 130 can select a connection policy for system 100 according to the affected performance parameter. Operation of the watermarking component 110, performance monitoring component 120, and policy selection component 130 are described in further detail below.

In an aspect, the watermarking component 110, performance monitoring component 120, and/or policy selection component 130 can be implemented via a NAS node device and/or another suitable device that provides an interface to data storage implemented via, e.g., individual data drives or logical and/or physical groups of drives. Logical groups of data drives can include Redundant Array of Independent Disks (RAID) arrays and/or any other groups of hard drives that are logically coupled in any suitable manner Physical groups of drives can include drive racks, sleds, and/or any other physical grouping of data drives. Further, it should be appreciated that while the performance monitoring component 120 is shown in FIG. 1 as communicating with one or more computing nodes 10 that are distinct from the components of system 100 for simplicity of explanation, some or all functionality of the watermarking component 110, performance monitoring component 120, and/or policy selection component 130 could be implemented on one or more of the computing nodes 10 without departing from the scope of the description provided below or the claimed subject matter.

In an aspect, the watermarking component 110, performance monitoring component 120, and/or policy selection component 130 can be implemented via a same device or multiple devices. For instance, the watermarking component 110 can be implemented by a first device, the performance monitoring component 120 can be implemented by the first device or a second device, and the policy selection component 130 can be implemented by the first device, the second device, or a third device. Also or alternatively, the functionality of respective components as described herein can be distributed among multiple computing devices.

Figure 2:
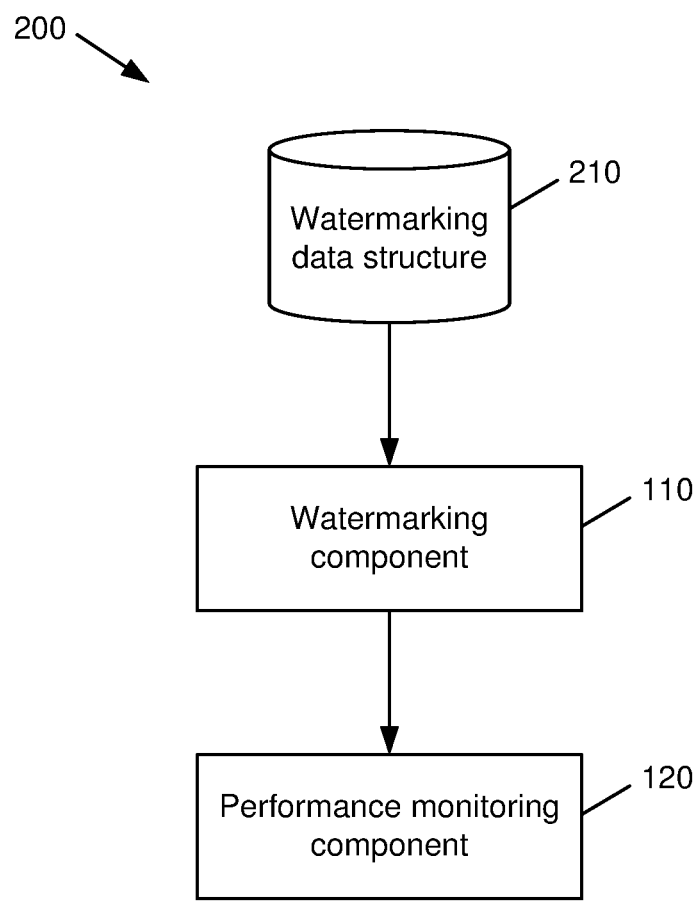
FIG. 2 is a block diagram of a system that facilitates initialization of performance analysis and watermarking in an NAS system in accordance with various aspects described herein.

Turning next to FIG. 2, a block diagram of a system 200 that facilitates initialization of performance analysis and watermarking in an NAS system in accordance with various aspects described herein is illustrated. Repetitive descriptions of like parts described in previous embodiments herein is omitted for the sake of brevity. As shown by FIG. 2, system 200 includes a watermarking component 110 that can be utilized to define performance parameters and corresponding operating ranges which can subsequently be utilized by a performance monitoring component as described above.

In an aspect, the performance monitoring component 120 can include a performance monitor daemon (PMD), which can be a per-node process (e.g., implemented in software via instructions stored on a memory and executed by a processor) that runs in the background in order to monitor various performance parameters of the node. The PMD can operate based on specified performance parameters and corresponding operating ranges provided by the watermarking component 110 via a watermarking data structure 210. In an aspect, the watermarking data structure 210 can be a table or other suitable data structure (e.g., tree, linked list, etc.) that includes data relating to respective performance parameters and respective operating ranges for those parameters.

Figure 3:
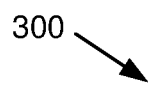
FIG. 3 is a diagram depicting an example data structure that can be utilized to store performance watermark data in accordance with various aspects described herein.

By way of specific, non-limiting example, the watermarking data structure 210 can be maintained in a tabular format such as that shown by diagram 300 in FIG. 3. As shown by diagram 300, the watermarking component 110 can define the watermarking data structure 210 as a performance monitor table (PMT) that stores information relating to respective performance parameters and their desired operating ranges, e.g., as defined by a high watermark (WM) and a low watermark. In the example shown by diagram 300, the PMT contains operating ranges corresponding to CPU usage, memory usage, network throughput, and two custom parameters. Here, network throughput refers to the sum of all uplink and downlink network bandwidth consumed by a given computing node at a given time, e.g., due to file transfers and/or other network communication tasks. Additionally, the custom parameters can include any performance parameters and/or combination of performance parameters upon which respective computing nodes can be managed. The custom parameters can include performance parameters listed elsewhere in the PMT and/or other parameters, such as power consumption, local disk usage, system temperature, or the like.

In an aspect, the high and low watermarks given by the PMT can define the edges of the operating ranges for the respective listed performance parameters. For instance, a data storage system using a PMT as shown by diagram 300 can be configured to switch to a connection policy for a given listed parameter if utilization of that parameter on an associated node goes above the high watermark or below the low watermark for that parameter.

In another aspect, the watermarking data structure 210 can utilize the same operating ranges and/or associated watermarks for all nodes in the system. Alternatively, different ranges and/or associated watermarks can be specified for the same parameters on different nodes. Different per-node ranges could be used, for instance, for a cluster composed of nodes of different hardware types.

Figure 4:
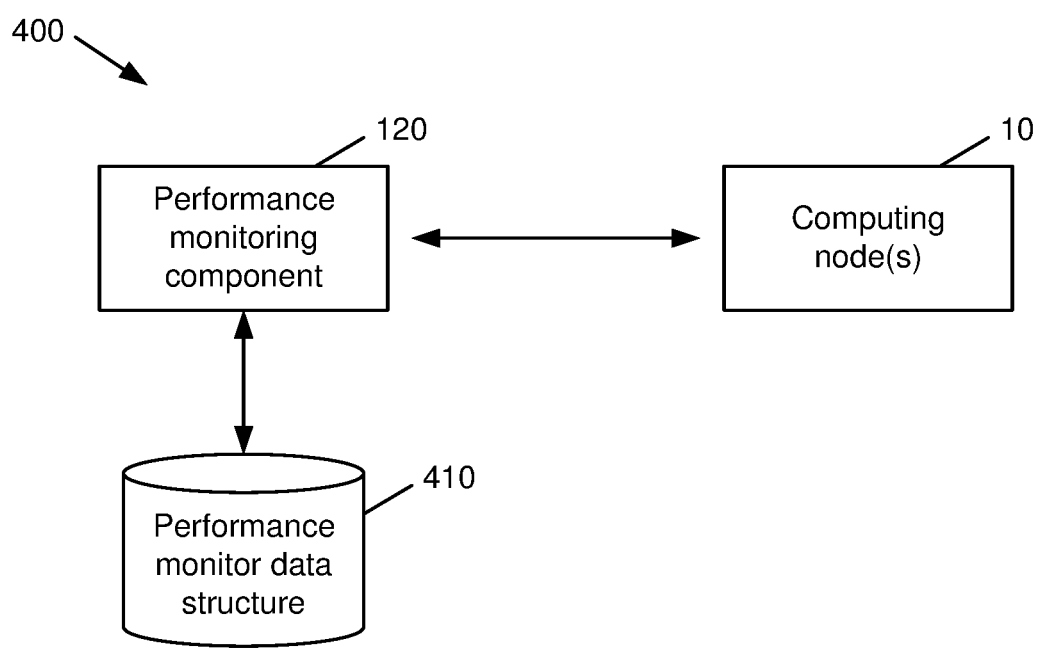
FIG. 4 is a block diagram of a system that facilitates maintenance of system performance data in accordance with various aspects described herein.

Referring now to FIG. 4, a block diagram of a system 400 that facilitates maintenance of system performance data in accordance with various aspects described herein is illustrated. Repetitive descriptions of like parts described in previous embodiments herein is omitted for the sake of brevity. As shown by FIG. 4, system 400 include a performance monitoring component 120 that can track performance of respective computing nodes 10 across various performance parameters. As further shown in system 400, the performance monitoring component 120 can maintain a performance monitor data structure 410 that includes information relating to the respective performances of the computing nodes 10 with respect to the respective performance parameters as monitored by the performance monitoring component 120, e.g., as specified by a watermarking component 110 as described above with respect to FIGS. 2-3.

By way of specific, non-limiting example, the performance monitor data structure 410 can be maintained in a tabular format, such as that shown by diagram 500 in FIG. 5. In an aspect, the table shown by diagram 500 can include a cluster-wide matrix of real time or near-real time performance statistics with respect to respective performance parameters (e.g., the performance parameters specified in the watermarking data structure 210) across respective computing nodes 10 in the system. While the table shown by diagram 500 illustrates a cluster having four nodes, it should be appreciated that any number of nodes can be tracked in a similar manner.

In an aspect, the performance monitoring component 120 can utilize the performance monitor data structure 410, which can employ the structure shown by diagram 500 or another suitable structure, to determine whether a performance parameter on a given computing node 10 has gone above or below the watermarks specified by the watermarking component 110. In the event that a performance parameter for a computing node 10 has fallen outside an operating range defined by the corresponding high and low watermarks, the connection policy for system 400 can be modified, and/or other appropriate actions can be taken. Various actions that can be taken in response to monitored performance of respective computing nodes 10 are described in further detail below.

In an aspect, maintenance of the performance monitor data structure 410 can be performed in a distributed manner across respective computing nodes 10 of an NAS system. For instance, as shown by system 600 in FIG. 6, respective computing nodes 10 can monitor their own local node performance (e.g., via a performance monitoring component 120 local to the respective nodes and/or other suitable means) and store monitored local performance updates to respective copies of the performance monitor data structure 410 that are stored by the respective computing nodes 10.

Figure 6:
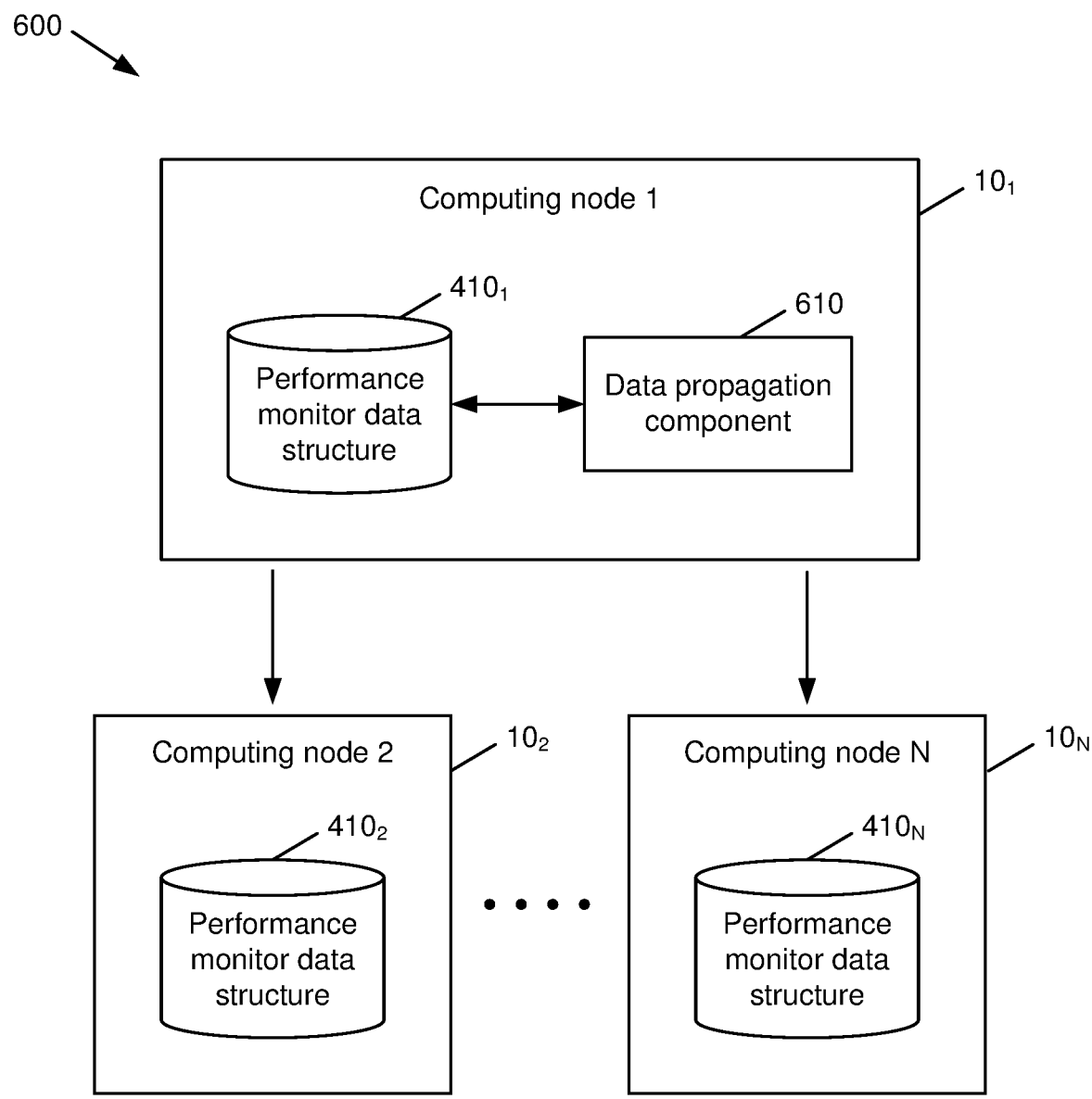
FIG. 6 is a block diagram of a system that facilitates propagation of system performance data between computing nodes of a distributed system in accordance with various aspects described herein.

In an aspect, respective computing nodes 10 of system 600 can include a data propagation component 610 that can propagate changes made to the performance monitor data structure 410 by a given computing node 10 to respective copies of the performance monitor data structure 410 as stored by other computing nodes 10 in system 600. While only one computing node 10 in FIG. 6 is illustrated as including a data propagation component 610 for simplicity of illustration, it should be appreciated that each computing node 10 in system 600 can similarly include a data propagation component 610 that can propagate node performance updates to the performance monitor data structure 410 as stored by respective other computing nodes 10 in system 600. In this way, the performance monitor data structure 410 can be shared among computing nodes 10 in system 600 in a collaborative way to reduce the amount of network resources utilized by system 600 in connection with maintaining the performance monitor data structure 410.

Figure 7:
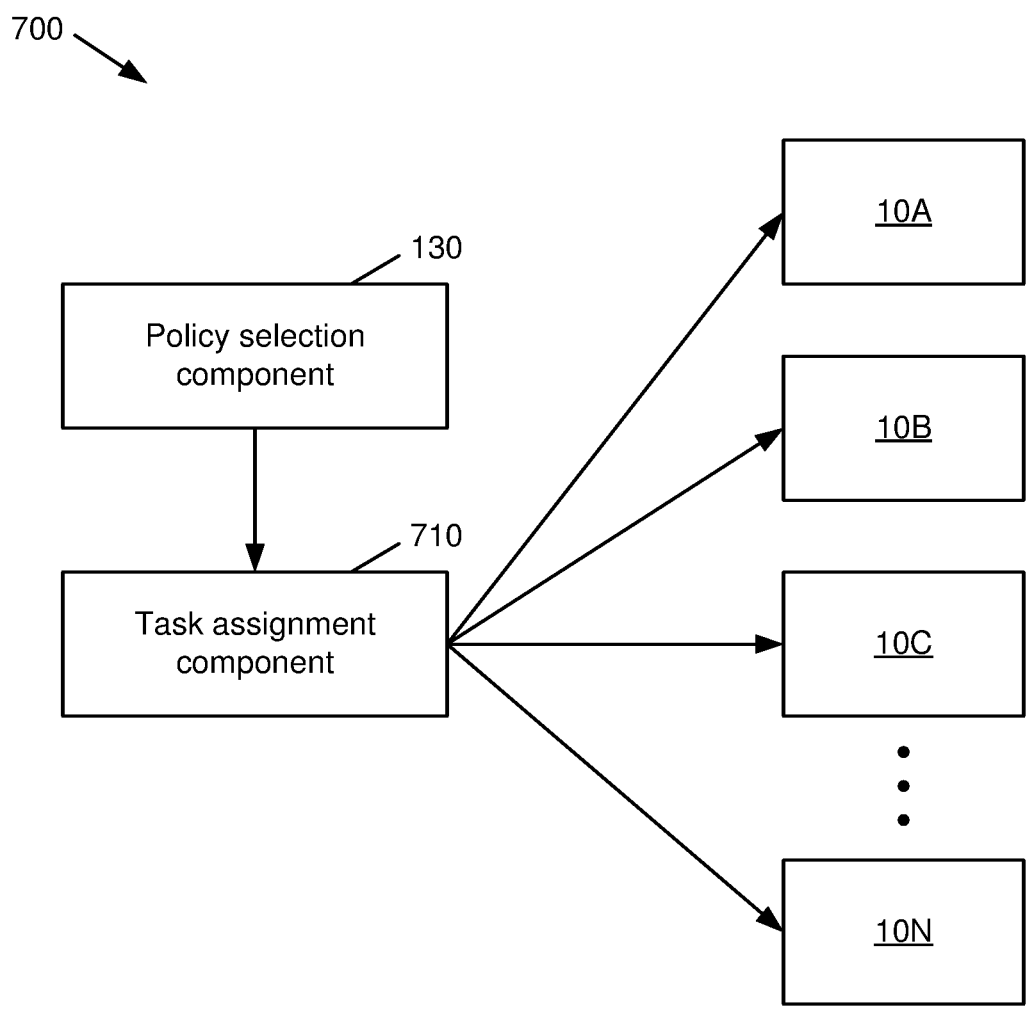
FIGS. 7-8 are block diagrams of respective systems that facilitate adaptive client connection management for an NAS system in accordance with various aspects described herein.

With reference next to FIG. 7, a block diagram of a system 700 that facilitates adaptive client connection management for an NAS system in accordance with various aspects described herein is illustrated. Repetitive descriptions of like parts described in previous embodiments herein is omitted for the sake of brevity. System 700 as shown by FIG. 7 includes a task assignment component 710, which can assign a data access task to one of N computing nodes 10A-10N of system 700 according to a connection policy selected by the policy selection component 130 according to various aspects described herein. In an aspect, respective computing nodes 10 in system 700 can be configured with unique IP addresses, indexes, or other uniquely identifying information, and the task assignment component 710 can act as a forwarder to direct client connections to respective computing nodes 10 of system 700 according to their availability and the policy(-ies) set by the policy selection component 130.

By way of specific, non-limiting example, system 700 can be given a designated domain name, a uniform resource locator (URL), or other information that enables access to system 700 over an Internet or Intranet connection, e.g., via a Web browser. A client user can then request access to system 700 by supplying the designated domain name and any associated authentication credentials (e.g., username, password, etc.). Upon a successfully authenticated request, the task assignment component 710 can act as a DNS resolver or forwarder to direct the user's connection to the IP address of an appropriate computing node 10 of system 700 according to the presently selected connection policy. Once connected to a particular computing node 10, the user can be granted access to respective data stored on any computing node 10 of system 700 via the user's connection to the selected computing node 10.

In an aspect, IP addresses or other identifiers assigned to the respective computing nodes 10 can be local in scope to system 700 or global. In the event that local IP addresses are used for the computing nodes 10, the task assignment component 710 can direct client traffic to the respective computing nodes 10 provided that it resides on the same local network as the computing nodes 10. In addition to the above example, other processes for directing client connections to an appropriate computing node 10 based on a selected connection policy could also be used.

In another aspect, a user can be provided the ability to access a particular computing node 10 directly, e.g., via its individually assigned IP address and/or by other means. A direct connection established in this manner can in some cases be authorized to bypass the policy-based node selection as provided herein. In such a case, node resource usage associated with direct node connections could be taken into consideration in addition to dynamic client connections in selection of a connection policy via the policy selection component 130 and/or assignment of subsequent client connections to computing nodes 10 via the task assignment component 710.

In a further aspect, client connections established by the task assignment component 710 can be static or dynamic. For a dynamic connection, the task assignment component 710 can monitor the performance of the respective computing nodes in system 700, e.g., continuously or near-continuously, and reassign or hand off respective client connections between different computing nodes 10 of system 700 as desired to balance load between the computing nodes 10 with reference to the performance parameter selected by the policy selection component 130.

Figure 8:
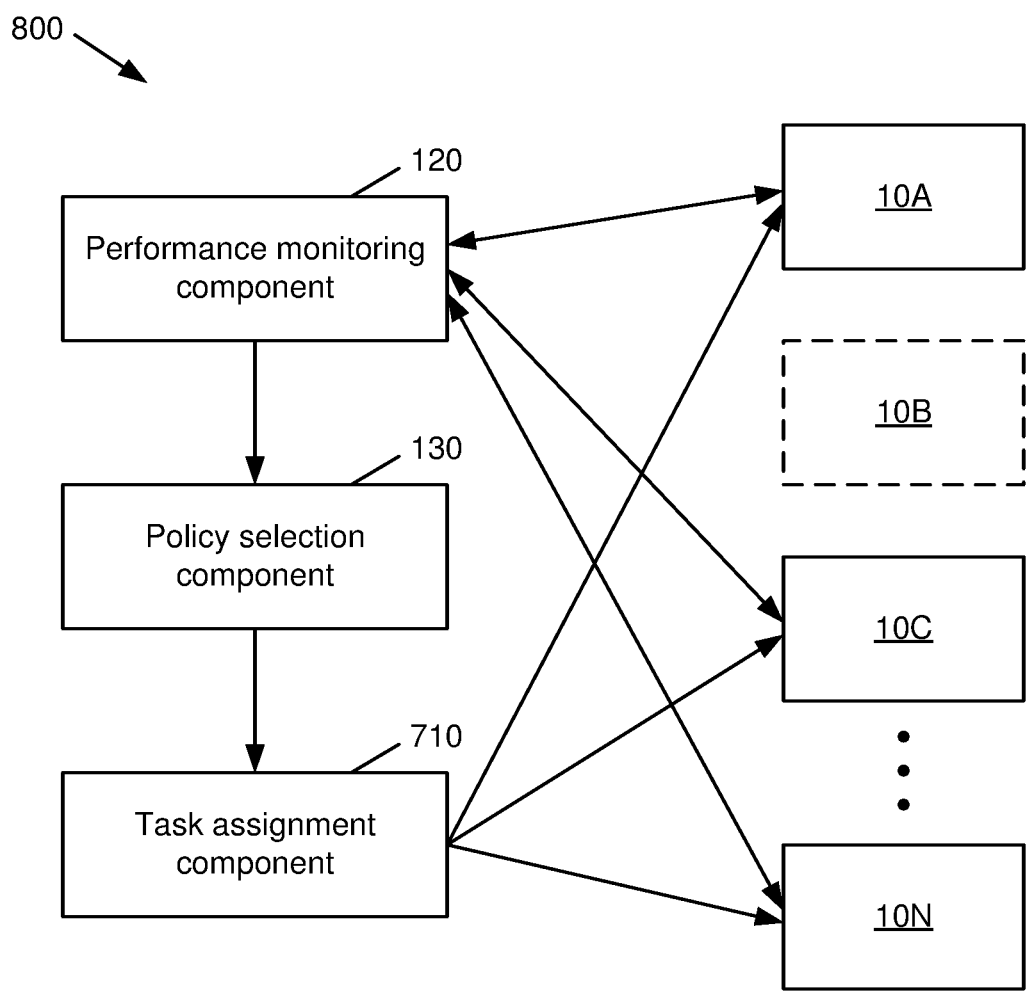

Referring now to FIG. 8, a block diagram of another system 800 that facilitates adaptive client connection management for an NAS system in accordance with various aspects described herein is illustrated. Repetitive descriptions of like parts described in previous embodiments herein is omitted for the sake of brevity. In addition to the policy selection component 130 and task assignment component 710 as described above with respect to FIG. 7, system 800 as shown in FIG. 8 includes a performance monitoring component 120 that can monitor and/or track the performance of respective computing nodes 10, here N computing nodes 10A-10N that are similar to the N computing nodes 10A-10N shown by FIG. 7, in the manner described above with respect to FIGS. 4-6. In an aspect, the performance monitoring component 120 and/or task assignment component 710 can monitor the active status of the computing nodes 10 of system 800. In response to one of the computing nodes 10 of system 800 (e.g., computing node 10B as shown in FIG. 8) going down or otherwise becoming unavailable for use, the performance monitoring component 120 can discontinue tracking the performance of the affected computing node 10 and/or otherwise invalidate any performance statistics associated with the affected computing node 10 during its unavailability. Also or alternatively, the task assignment component 710 can prevent assignment of client connections and/or other data access tasks to an unavailable computing node 10. In response to an unavailable computing node 10 coming back up or otherwise again becoming available for use, operation of the performance monitoring component 120 and the task assignment component 710 can proceed as described above.

Figure 9:
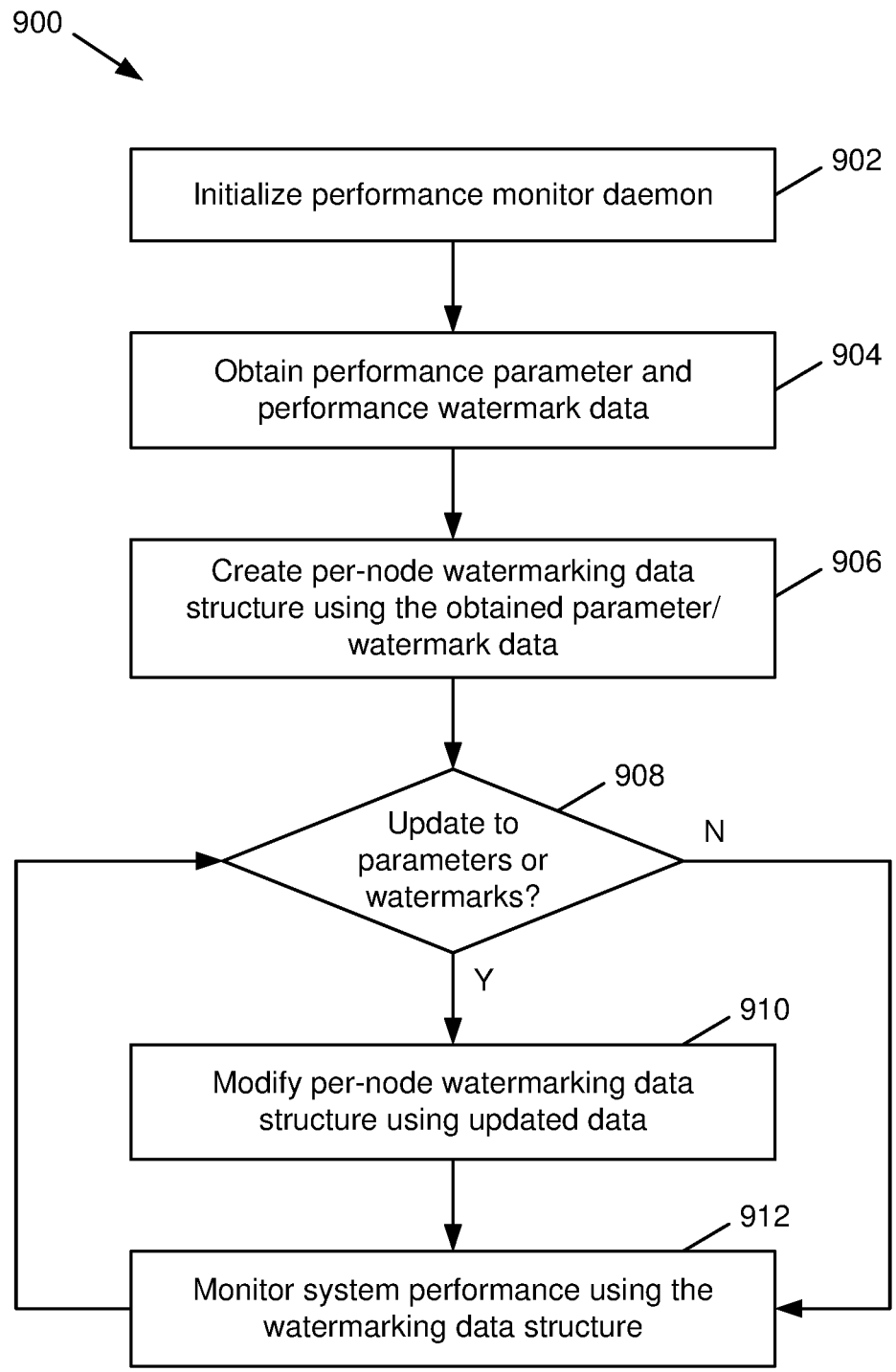
FIGS. 9-10 are flow diagrams of respective methods that facilitate managing a connection policy for a file storage system in accordance with various aspects described herein.

Turning to FIG. 9, a flow diagram of a method 900 that facilitates managing a connection policy for a file storage system in accordance with various aspects described herein is illustrated. At 902, a PMD instance (e.g., as implemented via the performance monitoring component 120 at one or more computing nodes 10 as described above) can be initialized, e.g., upon boot up or initialization of the file storage system or one or more individual computing nodes 10 of the system.

At 904, performance parameters and their corresponding performance watermark data for a computing node 10 and/or the data storage system can be obtained (e.g., by a watermarking component 110). In an aspect, the data obtained at 904 can be provided by a system administrator or other entity, e.g., via a configuration file or by other means. If no configuration file or other source of data exists, the performance parameters and watermarks obtained at 904 can be based on system-specified default values.

At 906, a per-node watermarking data structure 210, e.g., a performance monitor table as shown by FIG. 3 and/or another suitable data structure, can be created (e.g., by the watermarking component 110) using the parameter and watermark data obtained at 904.

In an aspect, following creation of the watermarking data structure 210 at 906, adaptive connection management can be performed based on the watermarking data structure 210 in accordance with various aspects as described herein. As shown at 908, the system and/or one or more of its constituent computing nodes 10 can check for updates to the parameter and/or watermark data obtained at 904 during the adaptive connection management process. In an aspect, a system implementing method 900 can provide a means for a system administrator and/or other high-level system user to provide updates to the parameter and/or watermark data during operation of the system, and updates to said data as identified at 908 can be provided via administrator intervention in this manner. For instance, a system administrator can determine during the course of system operation that revisions to the performance parameters and/or watermarks are desirable to increase system efficiency and/or performance and provide those revisions to the system during its operation, thereby affecting how connection policies are dynamically selected by the system without the administrator manually changing the connection policy of the system or performing other, more time-consuming or intensive actions.

If updates to the parameters and/or watermarks were received at 908, method 900 can proceed to 910, in which the per-node watermarking data structure 210 can be updated (e.g., by the watermarking component 110) using the updated data obtained at 908. Following the update at 910, or if no update was received at 908, method 900 can proceed to 912, in which system performance can be monitored (e.g., by the performance monitoring component 120) using the watermarking data structure 210 created at 906 and/or modified at 910. As further shown by FIG. 9, performance monitoring performed at 912 can occur alongside, or in alternating operations, with checking for updated parameter and/or watermark data at 908.

In an aspect, the PMD initialized at 902 can create a globally unique and shared performance monitor data structure 410 that includes real time or near-real time performance data from respective computing nodes 10 of the system, e.g., as described above with respect to FIGS. 4-6. The performance monitor data structure 410 can be constructed such that PMDs resident on respective ones of the computing nodes 10 can update performance parameters of their own computing nodes 10 on the performance monitor data structure 410 but can read the performance parameters of all computing nodes 10, e.g., via per-node propagation components 610 as described with respect to FIG. 6. As further described above with respect to FIG. 8, if a computing node 10 of the system goes down, its performance data can be deemed invalid until the affected computing node 10 again becomes available for use.

Figure 10:
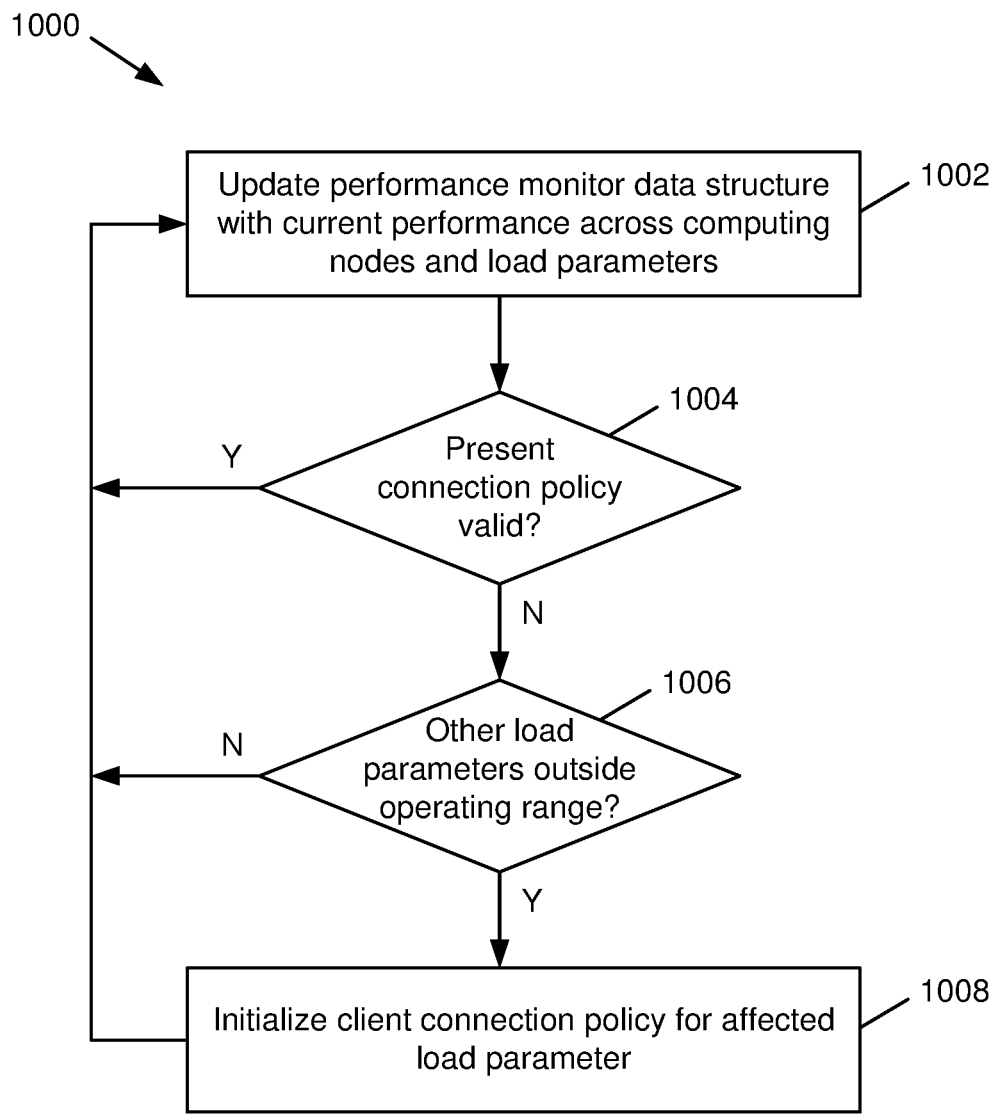

Based on the above structure, the PMD associated with a given computing node 10 (e.g., as implemented via a performance monitoring component 120 on the computing node 10) can operate in a loop as shown by method 1000 in FIG. 10 to facilitate node performance monitoring and dynamic policy selection (e.g., via the policy selection component 130).

At 1002, the PMD of a computing node 10 (e.g., via the performance monitoring component 120) can update its local performance monitor data structure 410 with the current performance of the node across the load parameters designated by the watermarking component 110. In an aspect, these updates can be propagated to and from other computing nodes 10 in the system, thereby facilitating updates to the performance monitor data structure 410 across respective computing nodes 10 over the designated load parameters.

At 1004, the PMD can check whether the present connection policy is still valid, e.g., whether continuation of the present connection policy continues to be desirable due to the load parameter corresponding to the policy continuing to be above the high watermark or below the low watermark, as specified by the watermarking component 110. If the present connection policy continues to be valid, the connection policy can be left unchanged and method 1000 can return to 1002. Stated another way, in response to the performance of a computing node 10 of the system continuing to be outside of the operating range for the performance parameter corresponding to the present connection policy, the policy selection component 130 can continue use of the previously selected connection policy.

At 1006, if the present connection policy is no longer valid, e.g., due to the load parameter corresponding to the policy now falling within its designated operating range, the PMD can determine whether any other load parameters are outside their respective operating ranges (e.g., above their high watermark or below their low watermark, as specified by the watermarking component 110). If another load parameter is outside of its designated operating range, method 1000 can proceed to 1008, in which the client connection policy for the affected load parameter identified at 1006 can be initialized (e.g., by the policy selection component), and then return to 1002 for further monitoring. Otherwise, if there are no other load parameters outside of their designated operating ranges, the connection policy can be left unchanged and method 1000 can return to 1002. Stated another way, in response to the performance of a computing node 10 of the system being within the operating ranges for the respective performance parameters specified by the watermarking component 110, the policy selection component 130 can continue use of the previously selected connection policy.

Figure 11:
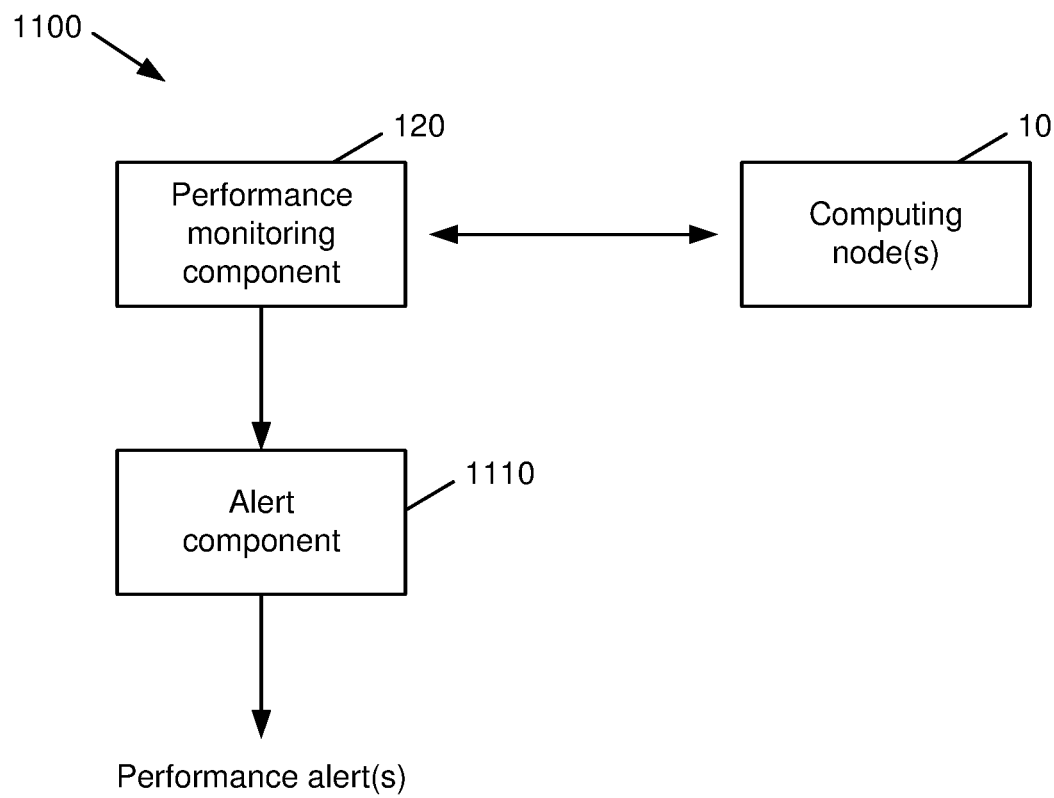
FIG. 11 is a block diagram of a system that facilitates issuance of system performance alerts in accordance with various aspects described herein.

With reference next to FIG. 11, a block diagram of a system 1100 that facilitates issuance of system performance alerts in accordance with various aspects described herein is illustrated. Repetitive descriptions of like parts described in previous embodiments herein is omitted for the sake of brevity. System 1100 as illustrated in FIG. 11 includes an alert component 1110, which can issue an alert in response to the performance of at least one computing node 10 of system 1100 being within a threshold amount from an edge of the operating range for a performance parameter, e.g., as specified by the watermarking component 110. In an aspect, system 1100 can be configured (e.g., by an administrator) to send alerts via the alert component 1110 whenever a performance parameter being monitored by the performance monitoring component 120 reaches within a threshold range to a watermark specified by the watermarking component 110. The range on which alerts can be issued by the alert component 1110 can be based on the operating range defined by the watermarks (e.g., within the upper X % or lower X % of the operating range defined by the high and low watermarks for the performance parameter and a threshold X) and/or the watermarks themselves (e.g., within 100+X % of the low watermark or 100-X % of the high watermark for the performance parameter and a threshold X). The alert range and/or its related threshold(s) can be set by system 1100 itself or provided as input to system 1100 by a system administrator or other user.

In an aspect, alerts issued by the alert component 1110 can be provided in any suitable manner, e.g., as entries in a log file, console alerts, a dialog box on a graphical user interface, etc. In one example, the alert component 1110 can initiate a preconfigured event of type "performance watermark alert," which can then be handled by an event handler associated with the alert component 1110 and/or other components of system 1100 in one or more appropriate manners. In another example, a system administrator or other user can enable or disable alerts from the alert component 1110 and/or control the manner in which said alerts are issued.

Figure 12:
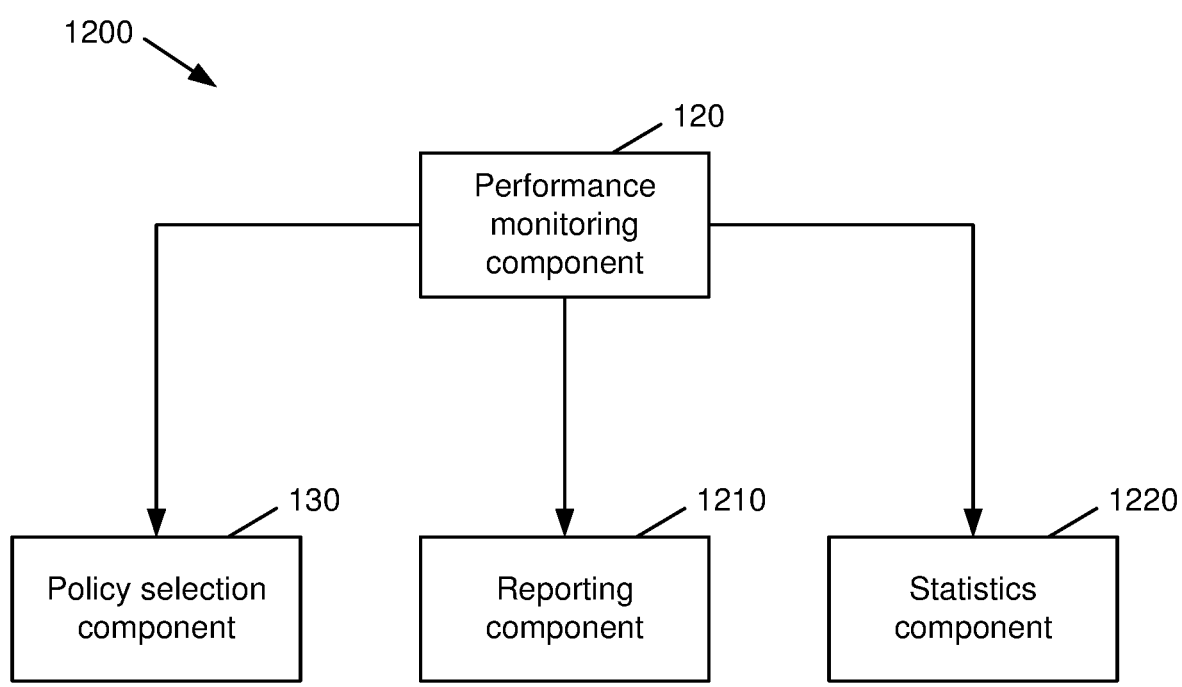
FIG. 12 is a block diagram of a system that facilitates processing of system performance data in accordance with various aspects described herein.

Referring now to FIG. 12, a block diagram of a system 1200 that facilitates processing of system performance data in accordance with various aspects described herein is illustrated. Repetitive descriptions of like parts described in previous embodiments herein is omitted for the sake of brevity. As shown in FIG. 12, system 1200 includes a performance monitoring component 120 that can generate and/or otherwise maintain system performance data in accordance with various embodiments as described above. The system performance data as generated and/or maintained by the performance monitoring component 120 can be utilized by a policy selection component 130 in order to facilitate a dynamic connection policy for client connections to an NAS system as also described in accordance with the various embodiments above. In addition, the system performance data as generated and/or maintained by the performance monitoring component 120 in system 1200 can be extended for additional uses, such as reporting and/or statistical purposes via a reporting component 1210 and a statistics component 1220, respectively. For instance, the reporting component 1210 can facilitate real-time or near real-time reporting of active client connections at respective computing nodes 10, and the statistics component 1220 can facilitate generation of comparative performance statistics for respective computing nodes 10. Other functions can also be performed by the reporting component 1210 and/or statistics component 1220. Also or alternatively, other uses of system performance data as generated and/or maintained by the performance monitoring component 120 or other associated components than those shown in FIG. 12 could also be used.

Figure 13:
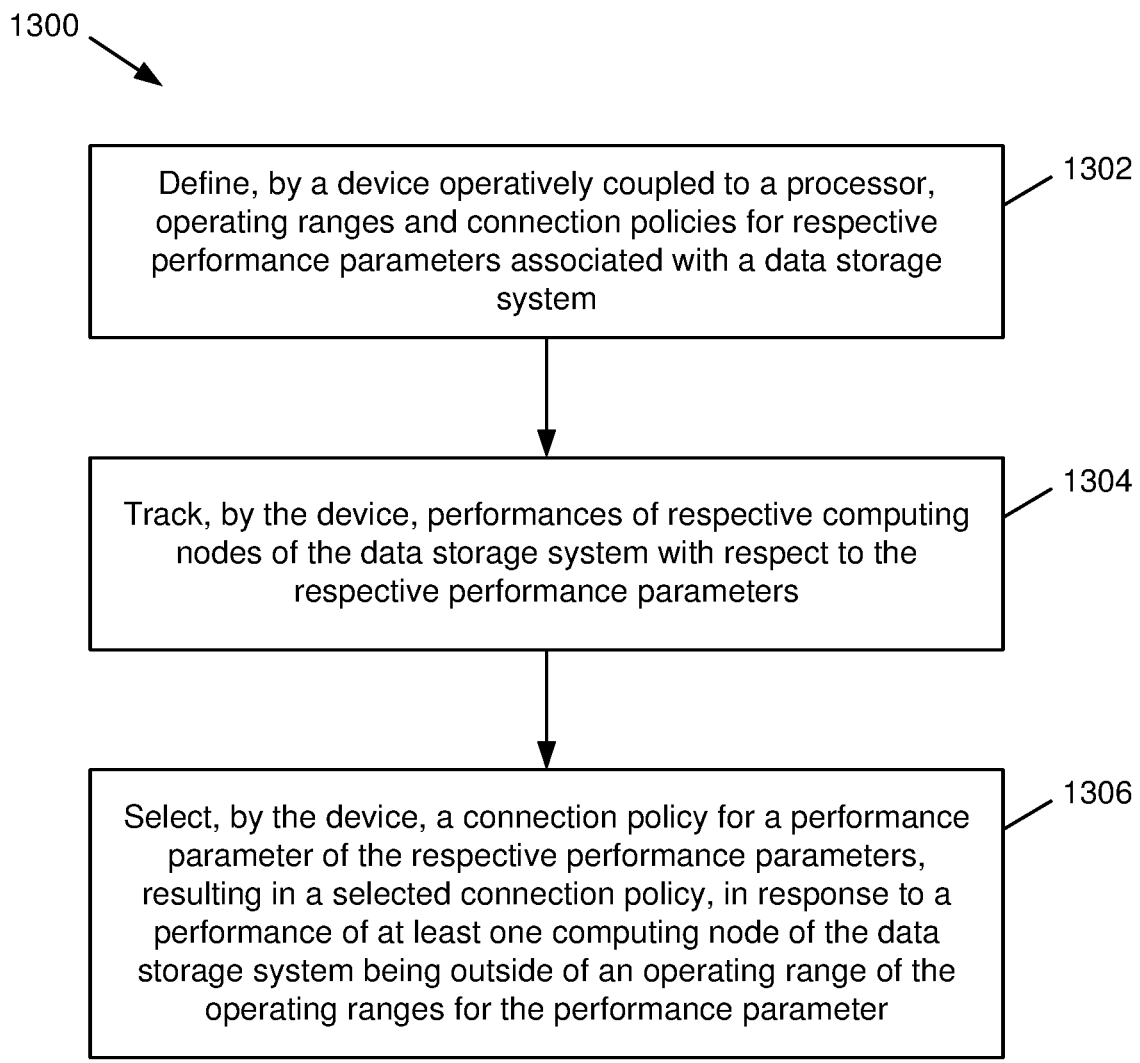
FIG. 13 is a flow diagram of a method that facilitates an adaptive connection policy for dynamic load balancing of client connections in accordance with various aspects described herein.

With reference to FIG. 13, presented is a flow diagram of a method 1300 that facilitates an adaptive connection policy for dynamic load balancing of client connections in accordance with various aspects described herein. At 1302, a device operatively coupled to a processor can define (e.g., via a watermarking component 110) operating ranges and connection policies for respective performance parameters associated with a data storage system.

At 1304, the device can track (e.g., via a performance monitoring component 120) performances of respective computing nodes 10 of the data storage system with respect to the respective performance parameters defined at 1302.

At 1306, the device can select (e.g., via a policy selection component 130) a connection policy for a performance parameter of the respective performance parameters defined at 1302, resulting in a selected connection policy, in response to a performance of at least one computing node 10 of the data storage system as tracked at 1304 being outside of an operating range for an associated performance parameter of the performance parameters defined at 1302.

FIGS. 9-10 and 13 as described above illustrate respective methods in accordance with certain aspects of this disclosure. While, for purposes of simplicity of explanation, the methods have been shown and described as series of acts, it is to be understood and appreciated that this disclosure is not limited by the order of acts, as some acts may occur in different orders and/or concurrently with other acts from that shown and described herein. For example, those skilled in the art will understand and appreciate that methods can alternatively be represented as a series of interrelated states or events, such as in a state diagram. Moreover, not all illustrated acts may be required to implement methods in accordance with certain aspects of this disclosure.

Figure 14:
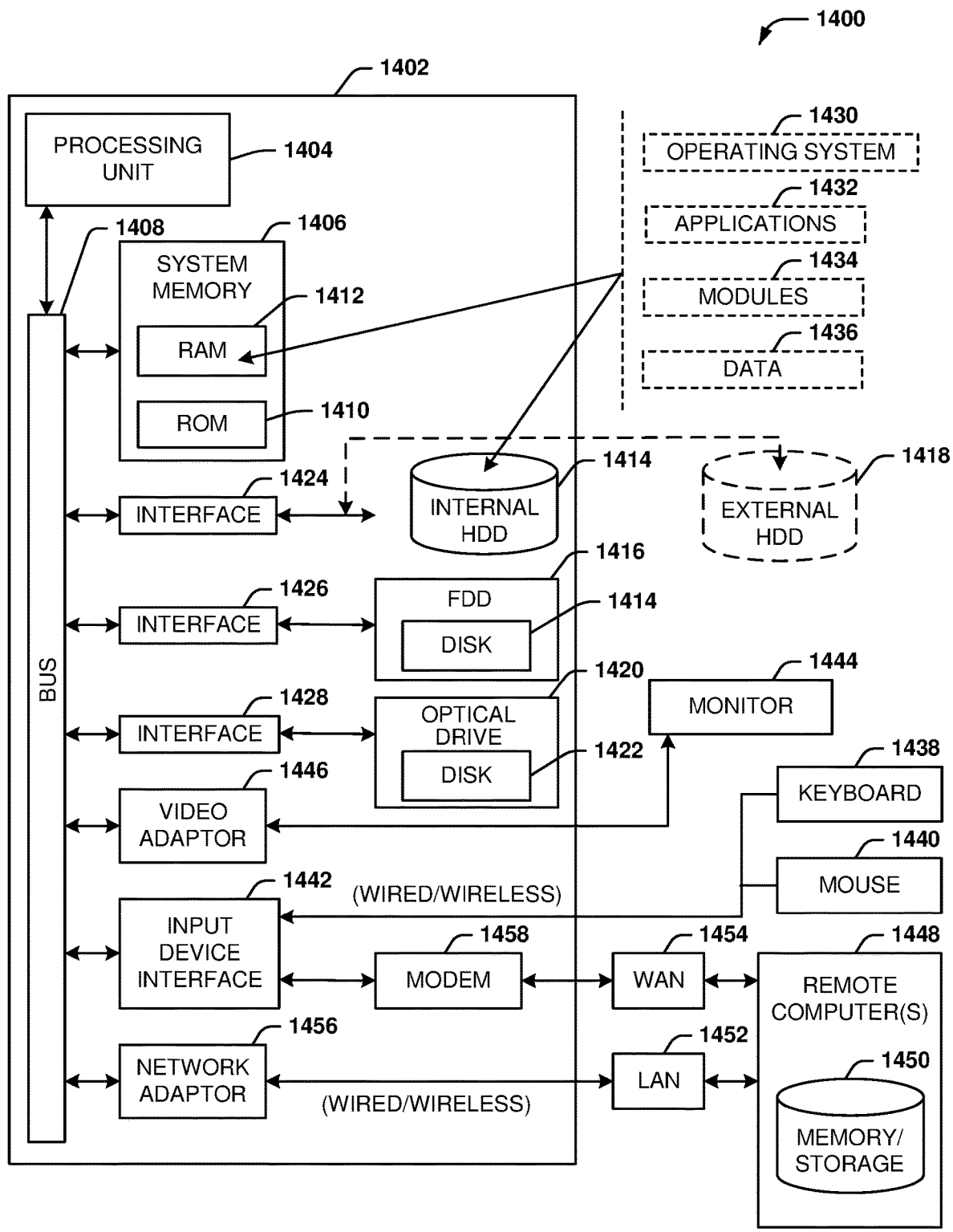
FIG. 14 is a diagram of an example computing environment in which various embodiments described herein can function.

In order to provide additional context for various embodiments described herein, FIG. 14 and the following discussion are intended to provide a brief, general description of a suitable computing environment 1400 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD-ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 14, the example environment 1400 for implementing various embodiments of the aspects described herein includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes ROM 1410 and RAM 1412. A basic input/output system (BIOS) can be stored in a non-volatile memory such as ROM, erasable programmable read only memory (EPROM), EEPROM, which BIOS contains the basic routines that help to transfer information between elements within the computer 1402, such as during startup. The RAM 1412 can also include a high-speed RAM such as static RAM for caching data.

The computer 1402 further includes an internal hard disk drive (HDD) 1414 (e.g., EIDE, SATA), a magnetic floppy disk drive (FDD) 1416, (e.g., to read from or write to a removable diskette 1418) and an optical disk drive 1420, (e.g., reading a CD-ROM disk 1422 or, to read from or write to other high capacity optical media such as the DVD). While the internal HDD 1414 is illustrated as located within the computer 1402, the internal HDD 1414 can also be configured for external use in a suitable chassis (not shown). The HDD 1414, magnetic FDD 1416 and optical disk drive 1420 can be connected to the system bus 1408 by an HDD interface 1424, a magnetic disk drive interface 1426 and an optical drive interface 1428, respectively. The interface 1424 for external drive implementations includes at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1402, the drives and storage media accommodate the storage of any data in a suitable digital format. Although the description of computer-readable storage media above refers to an HDD, a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. The systems and methods described herein can be implemented utilizing various commercially available operating systems or combinations of operating systems.

A user can enter commands and information into the computer 1402 through one or more wired/wireless input devices, e.g., a keyboard 1438 and a pointing device, such as a mouse 1440. Other input devices (not shown) can include a microphone, an infrared (IR) remote control, a joystick, a game pad, a stylus pen, touch screen or the like. These and other input devices are often connected to the processing unit 1404 through an input device interface 1442 that can be coupled to the system bus 1408, but can be connected by other interfaces, such as a parallel port, an IEEE 1394 serial port, a game port, a USB port, an IR interface, etc.

A monitor 1444 or other type of display device can be also connected to the system bus 1408 via an interface, such as a video adapter 1446. In addition to the monitor 1444, a computer typically includes other peripheral output devices (not shown), such as speakers, printers, etc.

The computer 1402 can operate in a networked environment using logical connections via wired and/or wireless communications to one or more remote computers, such as a remote computer(s) 1448. The remote computer(s) 1448 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1450 is illustrated. The logical connections depicted include wired/wireless connectivity to a local area network (LAN) 1452 and/or larger networks, e.g., a wide area network (WAN) 1454. Such LAN and WAN networking environments are commonplace in offices and companies, and facilitate enterprise-wide computer networks, such as intranets, all of which can connect to a global communications network, e.g., the Internet.

When used in a LAN networking environment, the computer 1402 can be connected to the local network 1452 through a wired and/or wireless communication network interface or adapter 1456. The adapter 1456 can facilitate wired or wireless communication to the LAN 1452, which can also include a wireless access point (AP) disposed thereon for communicating with the wireless adapter 1456.

When used in a WAN networking environment, the computer 1402 can include a modem 1458 or can be connected to a communications server on the WAN 1454 or has other means for establishing communications over the WAN 1454, such as by way of the Internet. The modem 1458, which can be internal or external and a wired or wireless device, can be connected to the system bus 1408 via the input device interface 1442. In a networked environment, program modules depicted relative to the computer 1402 or portions thereof, can be stored in the remote memory/storage device 1450. It will be appreciated that the network connections shown are example and other means of establishing a communications link between the computers can be used.

The computer 1402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A data storage system, comprising:
    a memory that stores computer executable components; and
    a processor that executes computer executable components stored in the memory, wherein the computer executable components comprise:
        a watermarking component that defines operating ranges and connection policies associated with the data storage system, wherein respective ones of the connection policies are configured to direct client connections to respective computing nodes of the data storage system based on respective performance parameters corresponding to the respective connection policies;
        a performance monitoring component that tracks respective performances of computing nodes of the data storage system with respect to the respective performance parameters; and
        a policy selection component that selects a connection policy configured to direct the client connections to the respective computing nodes of the data storage system based on a performance parameter of the respective performance parameters, resulting in a selected connection policy, in response to a performance of at least one of the respective computing nodes of the data storage system being outside of an operating range of the operating ranges for the performance parameter.

2. The data storage system of claim 1, wherein the performance monitoring component maintains a data structure comprising information relating to the respective performances of the computing nodes with respect to the respective performance parameters.

3. The data storage system of claim 2, wherein respective copies of the data structure are stored by the computing nodes, and wherein the data storage system further comprises:
    a data propagation component that propagates changes to the data structure made by a first one of the computing nodes to the respective copies of the data structure as stored by other ones of the computing nodes.

4. The data storage system of claim 1, wherein the performance parameters comprise at least one of a processor usage, a memory usage, or a network throughput.

5. The data storage system of claim 1, wherein the computer executable components further comprise:
   a task assignment component that assigns a data access task to a computing node of the respective computing nodes according to the selected connection policy.

6. The data storage system of claim 5, wherein the computing node is a first computing node, and wherein, in response to a second computing node of the computing nodes becoming unavailable for use, the performance monitoring component discontinues tracking the performance of the second computing node and the task assignment component prevents assignment of data access tasks to the second computing node.

7. The data storage system of claim 1, wherein the policy selection component continues use of the selected connection policy in response to the performance of the at least one computing node of the data storage system continuing to be outside of the operating range for the performance parameter.

8. The data storage system of claim 1, wherein the policy selection component continues use of the selected connection policy in response to the performance of the computing nodes of the data storage system being within the operating ranges for the respective performance parameters.

9. The data storage system of claim 1, wherein the computer executable components further comprise:
   an alert component that issues an alert in response to the performance of the at least one computing node of the data storage system being within a threshold amount from an edge of the operating range for the performance parameter.

10. A method, comprising:
    defining, by a device operatively coupled to a processor, operating ranges and connection policies associated with a data storage system, wherein respective ones of the connection policies are configured to direct client connections to respective computing nodes of the data storage system based on respective performance parameters corresponding to the respective connection policies;
    tracking, by the device, performances of respective computing nodes of the data storage system with respect to the respective performance parameters; and
    selecting, by the device, a connection policy configured to direct the client connections to the respective computing nodes of the data storage system based on a performance parameter of the respective performance parameters, resulting in a selected connection policy, in response to a performance of at least one of the respective computing nodes of the data storage system being outside of an operating range of the operating ranges for the performance parameter.

11. The method of claim 10, further comprising:
    maintaining, by the device, a data structure comprising information relating to the performances of the respective computing nodes with respect to the respective performance parameters.

12. The method of claim 11, further comprising:
    propagating, by the device, changes to the data structure made by a first one of the respective computing nodes to respective copies of the data structure as stored by ones of the respective computing nodes other than the first one.

13. The method of claim 10, wherein the respective performance parameters comprise at least one of processor usage, memory usage, or network throughput.

14. The method of claim 10, further comprising:
    assigning, by the device, a data access task to a computing node of the computing nodes according to the selected connection policy.

15. The method of claim 14, wherein the computing node is a first computing node, and wherein the method further comprises:
    in response to a second computing node of the respective computing nodes becoming unavailable for use, discontinuing, by the device, tracking the performance of the second computing node and preventing, by the device, assignment of data access tasks to the second computing node.

16. The method of claim 10, further comprising:
    issuing, by the device, an alert in response to the performance of at least one computing node of the data storage system being within a threshold amount from an edge of the operating range for the performance parameter.

17. A non-transitory machine-readable storage medium comprising computer executable instructions that, when executed by a processor of a data storage system, facilitate performance of operations, the operations comprising:
    defining respective operating ranges and respective connection policies associated with a data storage system, the respective connection policies being configured to direct client connections to respective computing nodes of the data storage system based on respective performance parameters corresponding to the respective connection policies;
    tracking respective performances of computing nodes of the data storage system with respect to the performance parameters; and
    selecting a connection policy of the respective connection policies configured to direct the client connections to the respective computing nodes of the data storage system based on a performance parameter of the performance parameters, resulting in a selected connection policy, in response to a performance of at least one of the respective computing nodes of the computing nodes of the data storage system being outside of an operating range of the respective operating ranges for the performance parameter.

18. The non-transitory machine-readable storage medium of claim 17, wherein the operations further comprise:
    maintaining a data structure comprising information relating to the respective performances of the computing nodes with respect to the performance parameters; and
    propagating changes to the data structure made by a first one of the computing nodes to respective copies of the data structure as stored by respective other ones of the computing nodes.

19. The non-transitory machine-readable storage medium of claim 17, wherein the operations further comprise:
    assigning a data access task to a computing node of the computing nodes according to the selected connection policy.

20. The non-transitory machine-readable storage medium of claim 17, wherein the operations further comprise:
    issuing an alert in response to the performance of at least one computing node of the data storage system being within a threshold amount from an edge of the operating range for at least one performance parameter.

\* \* \* \* \*